United States Patent
Visser et al.

(10) Patent No.: US 9,666,183 B2
(45) Date of Patent: May 30, 2017

(54) DEEP NEURAL NET BASED FILTER PREDICTION FOR AUDIO EVENT CLASSIFICATION AND EXTRACTION

(71) Applicant: QUALCOMM Incorporated, San Diego, CA (US)

(72) Inventors: Erik Visser, San Diego, CA (US); Yinyi Guo, San Diego, CA (US); Lae-Hoon Kim, San Diego, CA (US); Raghuveer Peri, San Diego, CA (US); Shuhua Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/671,850

(22) Filed: Mar. 27, 2015

(65) Prior Publication Data

US 2016/0284346 A1  Sep. 29, 2016

(51) Int. Cl.

| | | |
|---|---|---|
| *G10L 15/00* | (2013.01) | |
| *G10L 15/16* | (2006.01) | |
| *G10L 25/51* | (2013.01) | |
| *G10L 25/30* | (2013.01) | |
| *G10L 13/00* | (2006.01) | |
| *G10L 15/02* | (2006.01) | |
| *G10L 15/06* | (2013.01) | |
| *G10L 21/0208* | (2013.01) | |
| *G10L 21/0272* | (2013.01) | |

(52) U.S. Cl.
CPC .............. *G10L 15/16* (2013.01); *G10L 25/30* (2013.01); *G10L 25/51* (2013.01); *G10L 15/02* (2013.01); *G10L 15/063* (2013.01); *G10L 21/0208* (2013.01); *G10L 21/0272* (2013.01)

(58) Field of Classification Search
CPC ........ G10L 15/16; G10L 15/02; G10L 15/063
USPC ........................................ 704/202, 232, 259
See application file for complete search history.

(56) References Cited

U.S. PATENT DOCUMENTS

| | | |
|---|---|---|
| 2006/0217968 A1 | 9/2006 | Burges et al. |
| 2013/0204617 A1 | 8/2013 | Kuo et al. |
| 2014/0142958 A1 | 5/2014 | Sharma et al. |
| 2014/0257805 A1 | 9/2014 | Huang et al. |
| 2014/0278426 A1 | 9/2014 | Jost et al. |
| 2015/0254555 A1* | 9/2015 | Williams, Jr. ....... G06N 3/0454 706/14 |

\* cited by examiner

*Primary Examiner* — Thierry L Pham
(74) *Attorney, Agent, or Firm* — Toler Law Group, PC (57) ABSTRACT

Disclosed is a feature extraction and classification methodology wherein audio data is gathered in a target environment under varying conditions. From this collected data, corresponding features are extracted, labeled with appropriate filters (e.g., audio event descriptions), and used for training deep neural networks (DNNs) to extract underlying target audio events from unlabeled training data. Once trained, these DNNs are used to predict underlying events in noisy audio to extract therefrom features that enable the separation of the underlying audio events from the noisy components thereof.

29 Claims, 9 Drawing Sheets

FIG. 9

DEEP NEURAL NET BASED FILTER PREDICTION FOR AUDIO EVENT CLASSIFICATION AND EXTRACTION

TECHNICAL FIELD

This disclosure relates to audio event classification and extraction and, more particularly, to the use of deep neural nets for audio event classification and extraction.

BACKGROUND

Audio extraction problems are conventionally addressed using techniques such as single microphone stationary noise suppression or multi-microphone setups for gradually removing undesired signals from a target signal. The extracted desired signal is used for speech enhancement, speech recognition, audio transcription, and many other audio-based applications.

However, for these conventional methodologies to succeed, special static sensor placement and assumptions about input signal-to-noise ratios must be met. Thus, for many new use cases in the wearable, automotive, and other cutting-edge spaces where static sensor placement may not be possible due to distributed arrangements and/or spatially uncertain allocation with respect to the target sources, removing undesired signals from a target signal is beyond the abilities of typical audio extraction techniques.

SUMMARY

Various implementations disclosed herein are directed to methodologies for feature extraction and classification of audio signals using deep neural network based filter prediction, the methodology comprising various features such as: collecting audio event data under varying conditions; extracting features from the collected audio event data; labeling the extracted features with filter information; training a deep neural network to perform filter gain prediction using the extracted features; and performing filter gain prediction on a target audio event using the trained deep neural network. For such various implementations, the training may be iterative until the deep neural network predicts a filter gain meeting a predefined threshold.

For several implementations, the filter gain prediction may comprise: applying a predicted filter to an input spectrogram to yield a first output; applying the predicted filter to the first output to yield a second output; applying the predicted filter to the second output to yield a third output; and comparing the second output to the third output to determine if segmentation has improved and, if segmentation has improved, iteratively processing the third output for a subsequent compare and, if segmentation has not improved, then outputting the third output.

For certain implementations, training the deep neural network may comprise: acquiring audio event data for feature extraction; computing labels for a plurality of output layers corresponding to the deep neural network; and training the deep neural network using the acquired audio event data and the computed labels. Certain implementations may also collect audio event data using a distributed array of microphones and/or utilize extracted features comprising normalized spectral band energies for training the deep neural network.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Various implementations disclosed herein are directed to a feature extraction and classification methodology wherein audio data is gathered in a target environment under varying conditions. From this collected data, corresponding features are extracted, labeled with appropriate filters (e.g., audio event descriptions), and used for training deep neural networks (DNNs) to extract underlying target audio events from unlabeled training data. Once trained, these DNNs are used to predict underlying events in noisy audio to extract therefrom features that enable the separation of the underlying audio events from the noisy components thereof. Stated differently, underlying events can be predicted by extracting features from noisy audio and feeding them to the DNN to predict filters for carving out the underlying audio events from noisy spectrograms.

Several implementations are directed to different DNN training architectures, feature vectors (including combination audio inputs with other non-audio sensor inputs), and applications for the resulting DNNs once trained.

The methodology of these various implementations is described herein using a single microphone speech enhancement example where speech features are correctly predicted over a large input signal-to-noise ratio (SNR) range based on multi-pitch multi-SNR condition training; however, the methodology is not limited to such implementations or such specific inputs, and skills artisans will readily appreciate the general applicability of the methodology to other contexts using other inputs.

High quality audio separation generally requires multiple microphones spatially-arranged to optimize convergence time, and today various handheld devices (such as mobile phones, tablets, and the like) provide such an arrangement of microphones. In contrast, wearable devices integrate multiple distributed sensors to make sense of other aspects of the environments in which they are used, but these target environments, such as the home, in the automobile, and so forth, may have large spatial separation between each of the distributed sensors. As a result, these sensors cannot be used like fixed, closely-spaced microphones for beamforming in desired frequency ranges as is possible on the aforementioned various handheld devices.

Nevertheless, there is a need for continuous audio event monitoring and extraction with low bill-of-materials costs and power consumption requirements that could be effectively served using these distributed sensor applications. For example, non-stationary single-microphone noise reduction is desirable for natural speech recognition, yet requires audio feature modeling and extraction to filter out damaged or noisy audio events and filter gain predicted underlying audio events of interest.

Figure 1:
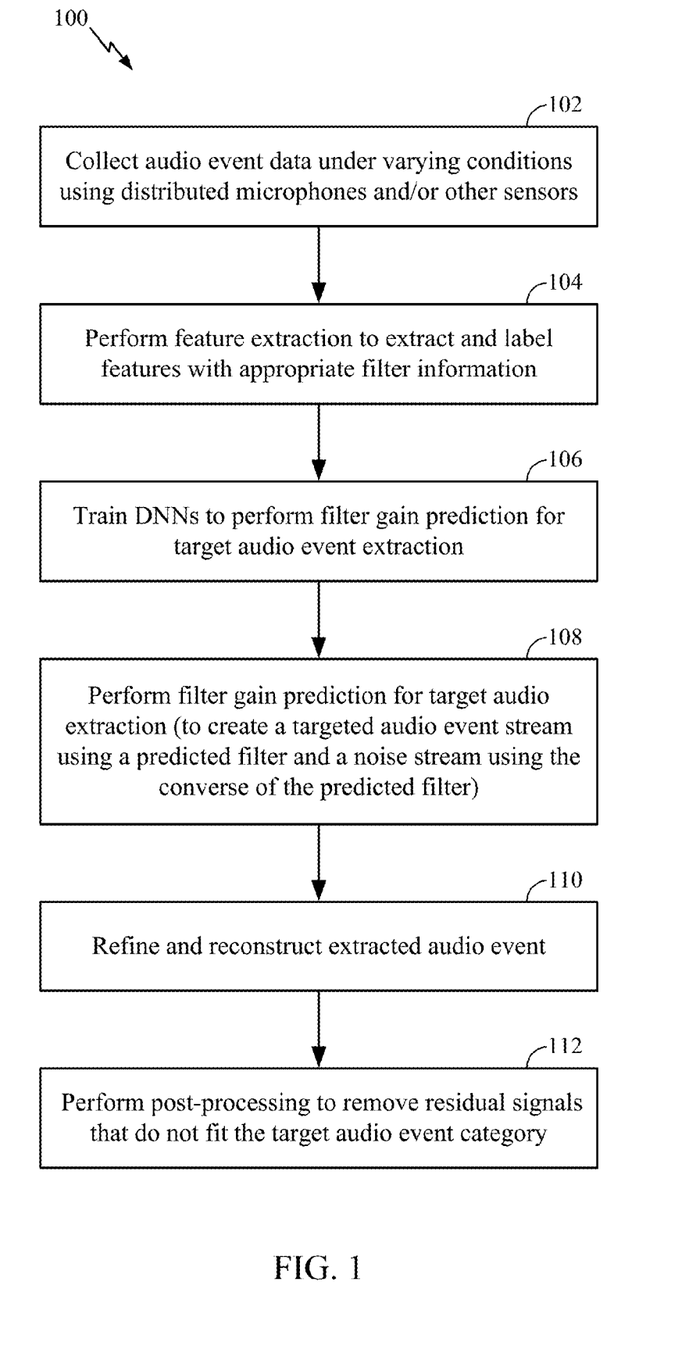
FIG. 1 is a process flow diagram for audio event extraction representative of various implementations.

FIG. 1 is a process flow diagram 100 for audio event extraction representative of various implementations herein disclosed. At 102, a plurality of distributed microphones and/or other sensors is used to collect audio event data under varying conditions. This audio event data may comprise both speech components and noise components.

From this collected audio, at 104 feature extraction is performed to extract and label features with appropriate filter information (e.g., audio even descriptions). Using these extracted features, at 106, one or more DNNs are trained to perform filter gain prediction for target audio event extraction.

After the training is completed, these DNNs perform filter gain prediction for target audio extraction by, at 108, creating both a targeted audio event stream using a predicted filter and a noise stream using the converse of the predicted filter (i.e., the "1-predicted filter"). At 110, the extracted audio event is refined and reconstructed by fitting basis functions using a dictionary approach such as, for example, Non-negative Matrix Factorization ("NNF"). At 112, post-processing is performed to remove residual signals that do not fit the target audio event category. At 114, audio event transcriptions are performed.

Figure 2:
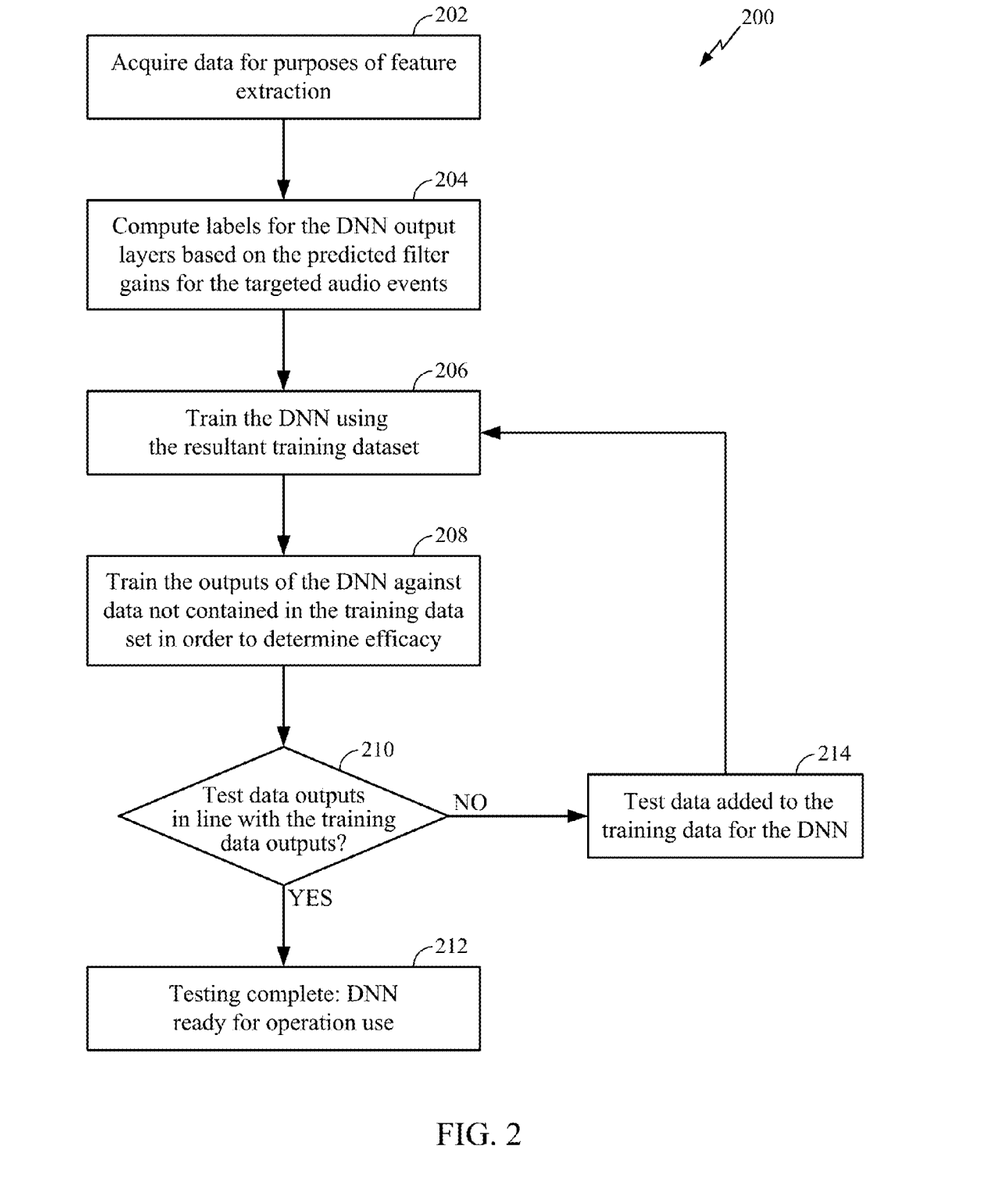
FIG. 2 is a process flow diagram for deep neural network (DNN) training representative of various implementations.

FIG. 2 is a process flow diagram 200 for DNN training representative of various implementations herein disclosed. The process flow of FIG. 2 is one approach for the DNN training 106 described above in the context of FIG. 1.

The DNN training begins at 202 with data acquisition for purposes of feature extraction thereof. The data acquisition may be performed by distributed microphones and/or other sensors used for collecting such data, and these data may include signal-to-noise ratio range information, target audio events, noise, and so forth. The feature extraction in turn may specifically provide spectral bands, delta spectral bands, and onset/offset information.

The microphone and sensor data so acquired should be within an expected signal-to-noise ratio range and comprise noise types encountered in particular use cases relevant to the DNNs training. Moreover, data acquired from certain devices, e.g., headsets, watches, vehicles, and so forth, might use specific sensor or microphone arrangements that can be used to provide accurate noise estimates for the acquired data. Likewise, feature extraction may include normalized spectral band energies that can be used to train specific customized DNNs to predict filter gains to be applied to recorded spectrograms in order to separate underlying audio events therein from noise.

At 204, labels are computed for the DNN output layers based on the predicted filter gains for the targeted audio events. For enhanced effectiveness, these computed labels for the DNN output layers may be based on knowledge of underlying target audio event, noise, and/or other sensor data such as data from an accelerometer, direction-of-arrival (DOA) detector, proximity detector, etc.

At 206, the DNN is trained using the resultant training dataset and, at 208, the outputs of the DNN training are tested against data not contained in the training data set to determine efficacy. At 210, a determination is made as to whether the test data outputs are in line with the training data outputs and, if so, then at 212 the DNN's training is complete and the DNN is ready for operational use. If not, however—i.e., if the test data outputs of the DNN are dissimilar from the training data outputs, thus indicating that the DNN is not yet sufficiently predicting target audio events—then at 214 the test data is added to the training data for the DNN, and the DNN returns to 206 for further training.

In effect, the DNNs are trained until any new addition of test data does not significantly change the predicted results of the DNN; otherwise, when the labels for new test data are not predicted sufficiently well by the existing DNN training data, the test data is added to the training data for further training of the DNN.

Likewise, the DNN training is complete and stopped when the inputs gathered for the DNN's particular use case create outputs that exhibit audio event like features, that is, when noisy speech inputs to the DNN results in speech-like output features form that DNN.

For example, to generate a training dataset, one might take several minutes (e.g., 23 minutes) of clean speech from among a group of people—preferably comprising both males and females in certain implementations (e.g., three each)—and then mix in 3GPP/OEM noise scenarios in the −5 to +25 dB signal-to-noise ratio range to create noisy speech $Y(t,f)$ from which a number of (e.g., 256) spectral bands f for an 8 kHz signal for each frame (512 FFT, 256 shift). Next, compute the noise power $N(t,f)$ and speech power $X(t,f)$ for each frame t/band f, and then compute filter gain $M(t,f)$ that predicts speech based on known signal-to-noise ratio: $X\_est(t,f)=M(t,f)*Y(t,f)$.

For feature and frame labeling—to continue the example—one might then extract features as $(\log(|Y(t,f)|)-\text{mean}(\log(|Y(t,:)|))/\max(|Y(:,f)|)$ bounded in [0-1] and use $M(t,f)$ bound in [0-1] as labels for each neural net output layer mode. The labels are then enforced in supervised neural net learning.

From this example, approximately 43000 frames are used for feature extraction and training, which in turn permits the training of 13 DNNs each with 257 input nodes, two hidden layers of 100 nodes each and one output layer of 17-20 nodes. (The 13 output layer nodes of these 13 DNNs combined in turn constitute predicted filter gain).

As previously noted, overfitting is avoided by increasing data for training and testing until the DNN returns consistent results for out-of-training test data.

Figure 3:
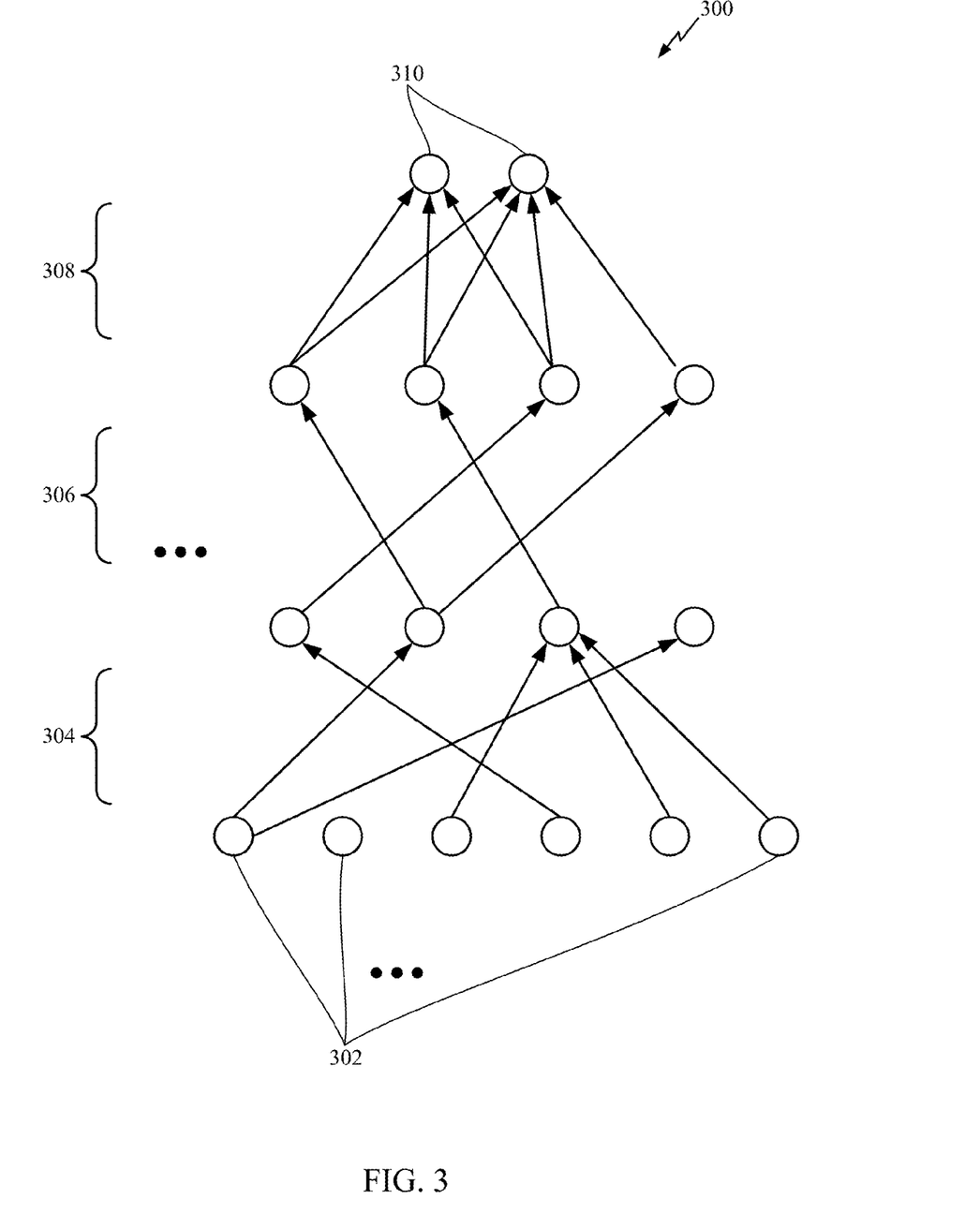
FIG. 3 is a progression diagram illustrating neural net based filter gain prediction in three phases for a DNN representative of various implementations.

FIG. 3 is a progression diagram 300 illustrating neural net based filter gain prediction in three phases (from feature extraction through training to prediction) for a DNN representative of various implementations herein disclosed. In the figure, the extracted features 302 (or, more precisely, the extracted features per frame or per combination of frames) progress through feature extraction 304 and training 306 to reach the prediction phase 308 and the resultant predicted filters 310 (or, more precisely, the predicted filter gain [0-1] per frame or per combination of frames).

With regard to FIG. 3, and for certain implementations, feature extraction may be achieved by calculating the log of spectral bands per frame of noisy spectrograms and subtracting therefrom the mean log normalized by variance per maximum. Likewise, training—with training data from speaker(s) in various noise scenarios with varying signal-to-noise ratios—may comprise unsupervised learning in a Deep Belief Network (DBN) where the DBN is folded onto the DNN and an output layer is added, and propagation is backed using a signal-to-noise ratio based predicted filter gain as labels (where speech and noise content of the noisy speech input is known). For the prediction phase, the trained DNN can then be used to predict filter gain and thus determine the underlying speech for each frame or combination of frames.

Figure 4:
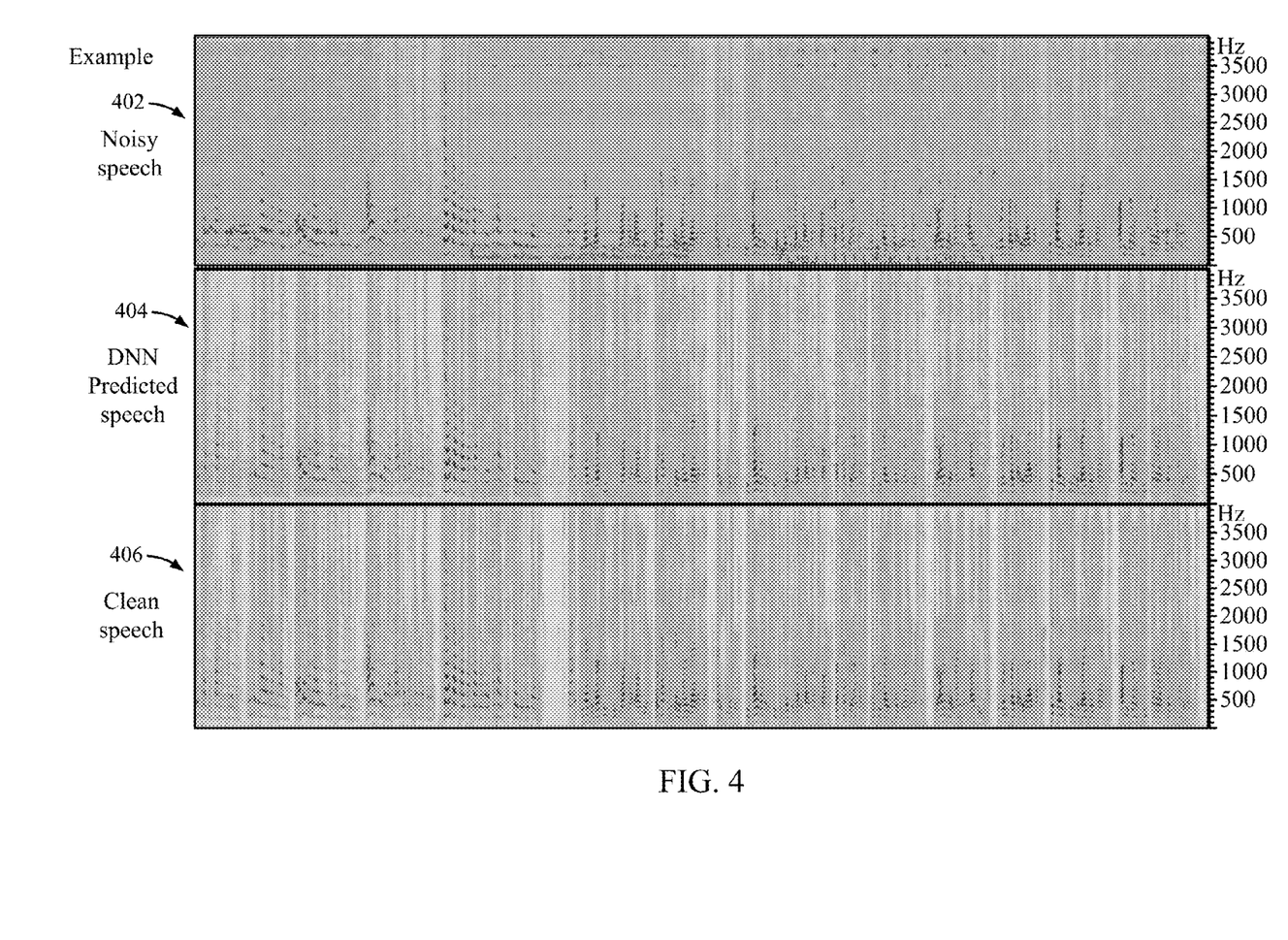
FIG. 4 is an exemplary spectrogram illustrating the results of DNN predicted speech based on input noisy speech compared to the actual clean speech representative of various implementations.

FIG. 4 is an exemplary spectrogram illustrating the results of DNN predicted speech 404 based on input noisy speech 402 compared to the actual clean speech 406 representative of various implementations disclosed herein.

Figure 5:
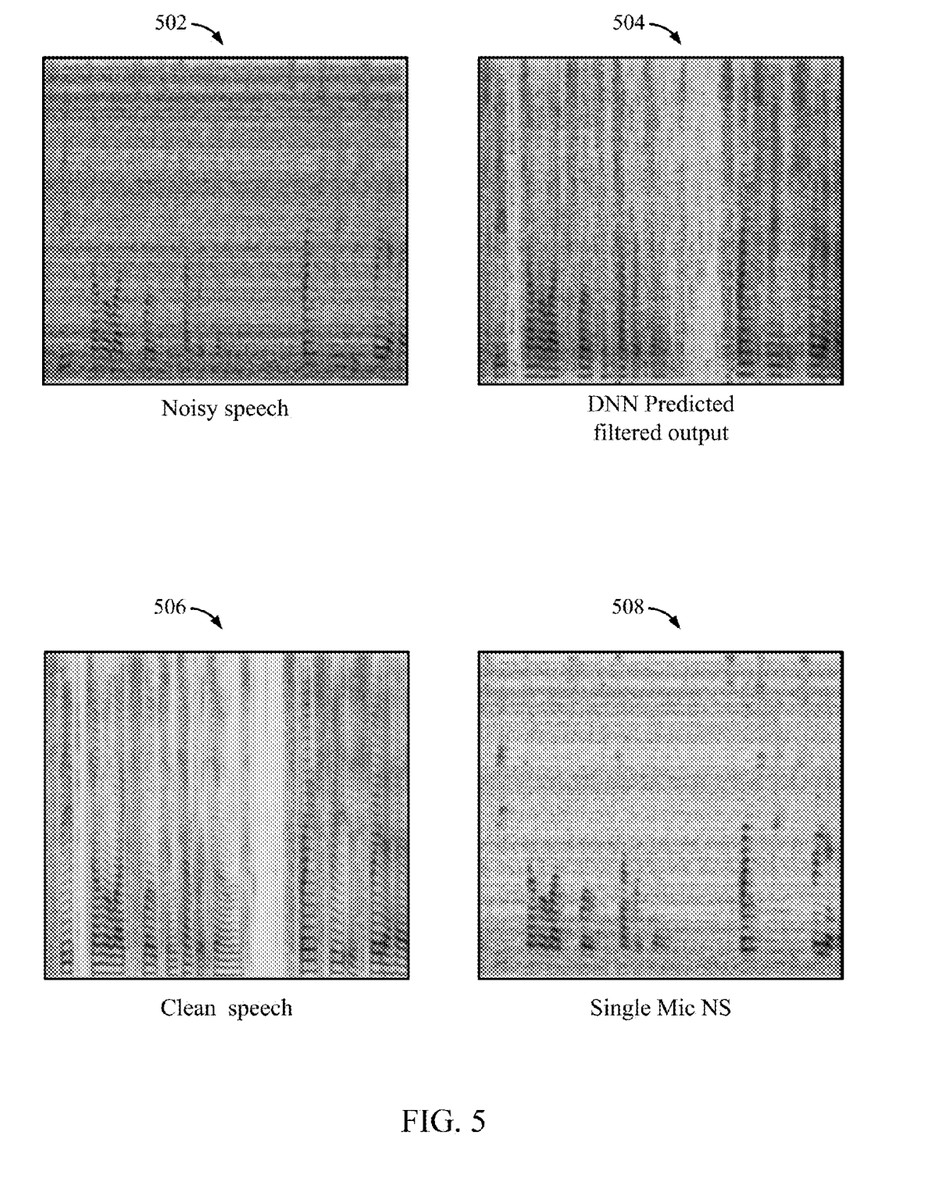
FIG. 5 provides exemplary spectrograms illustrating the results of DNN predicted filtered output from noisy speech representative of various implementations as compared to the actual clean speech and the results achievable by typical single microphone noise suppression.

FIG. 5 provides exemplary spectrograms illustrating the results of DNN predicted filtered output 504 from noisy speech 502 representative of various implementations disclosed herein as compared to the actual clean speech 506 and the results achievable by typical single microphone noise suppression (NS) 508.

Figure 6:
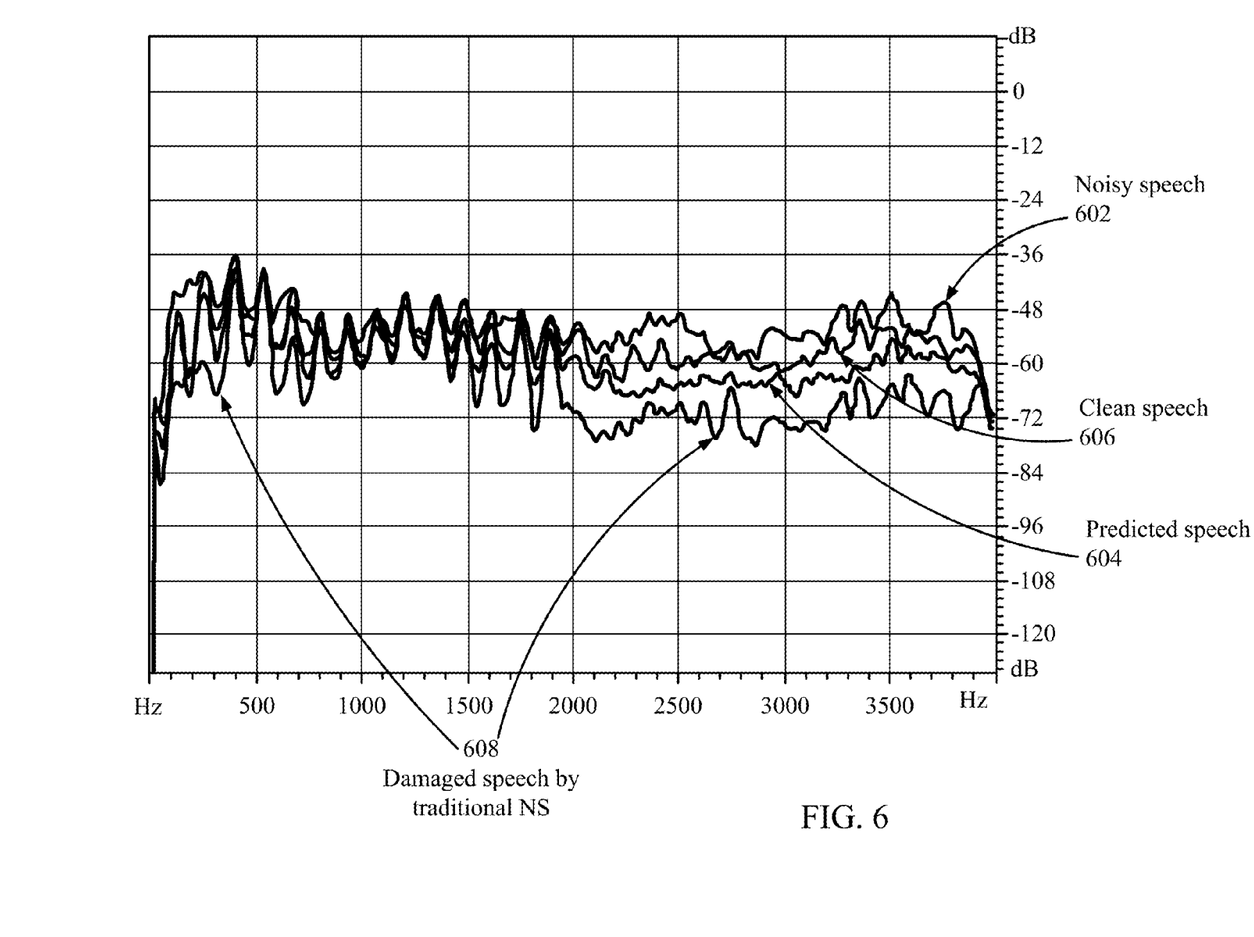
FIG. 6 is an exemplary pink noise frame spectrum comparison of DNN predicted speech from noisy speech representative of various implementations as compared to the actual clean speech and the damaged speech resulting from typical (or traditional) single microphone noise suppression.

FIG. 6 is an exemplary pink noise frame spectrum comparison of DNN predicted speech 604 from noisy speech 602 representative of various implementations disclosed herein as compared to the actual clean speech 606 and the damaged speech resulting from typical (or traditional) single microphone noise suppression 608.

Figure 7:
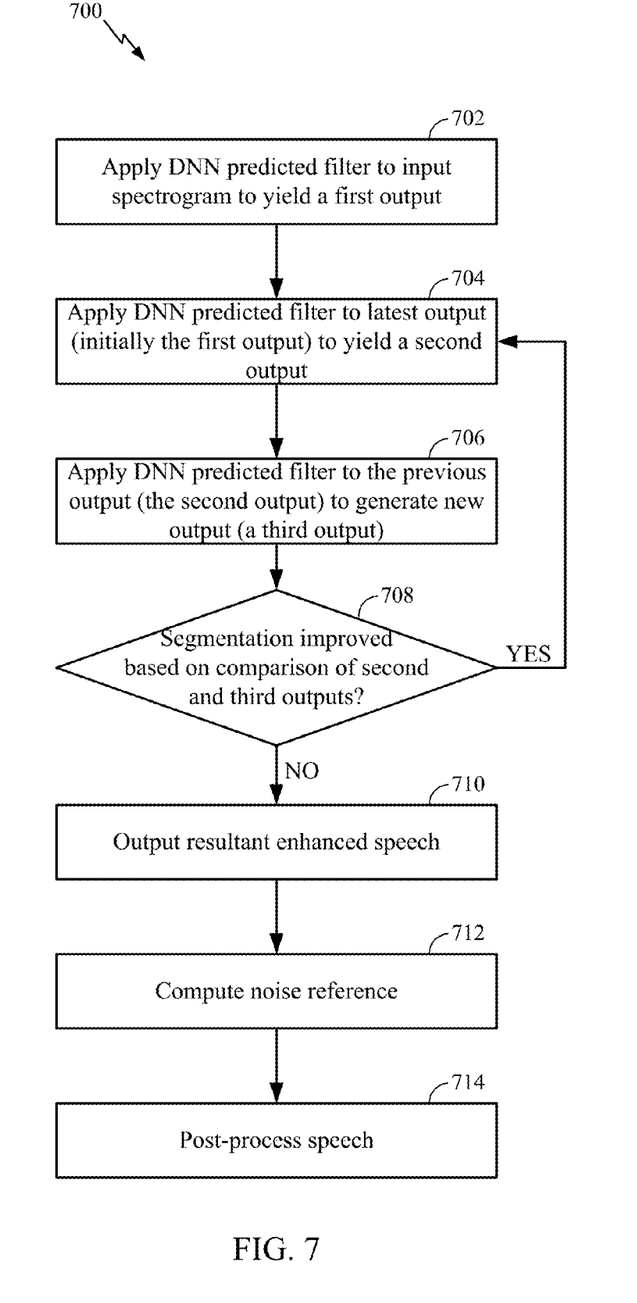
FIG. 7 is a process flow diagram for speech/noise separation by iterative filter prediction using a trained DNN representative of various implementations.

FIG. 7 is a process flow diagram 700 for speech/noise separation by iterative filter prediction using a trained DNN representative of various implementations herein disclosed. At 702, the DNN predicted filter is applied to an input spectrogram to yield a first output. At 704, the DNN predicted filter is applied to the latest output (which, initially, is the first output) to yield a second output, such that, if a noise frame, filter gain is less than one and, if a speech frame, filter gain is close to one. At 706, the DNN predicted filter is applied to the previous output (the second output, from 704) to generate a new output (i.e., a third output).

At 708, a check is made to determine if segmentation has improved, by comparing the second output with the third output. If the segmentation has improved, then the process returns to 704. If not, however, the resultant enhanced speech is output at 710, a noise reference is computed by subtracting scaled enhanced speech from noisy input at 712, and for certain implementations speech is post-processed using noise reference to further enhance that speech. Thus, for certain such implementations, noise frame attenuation can still be obtained by iterative application of DNN and post-processing even if speech/noise frames are not contained in the training database.

Figure 8:
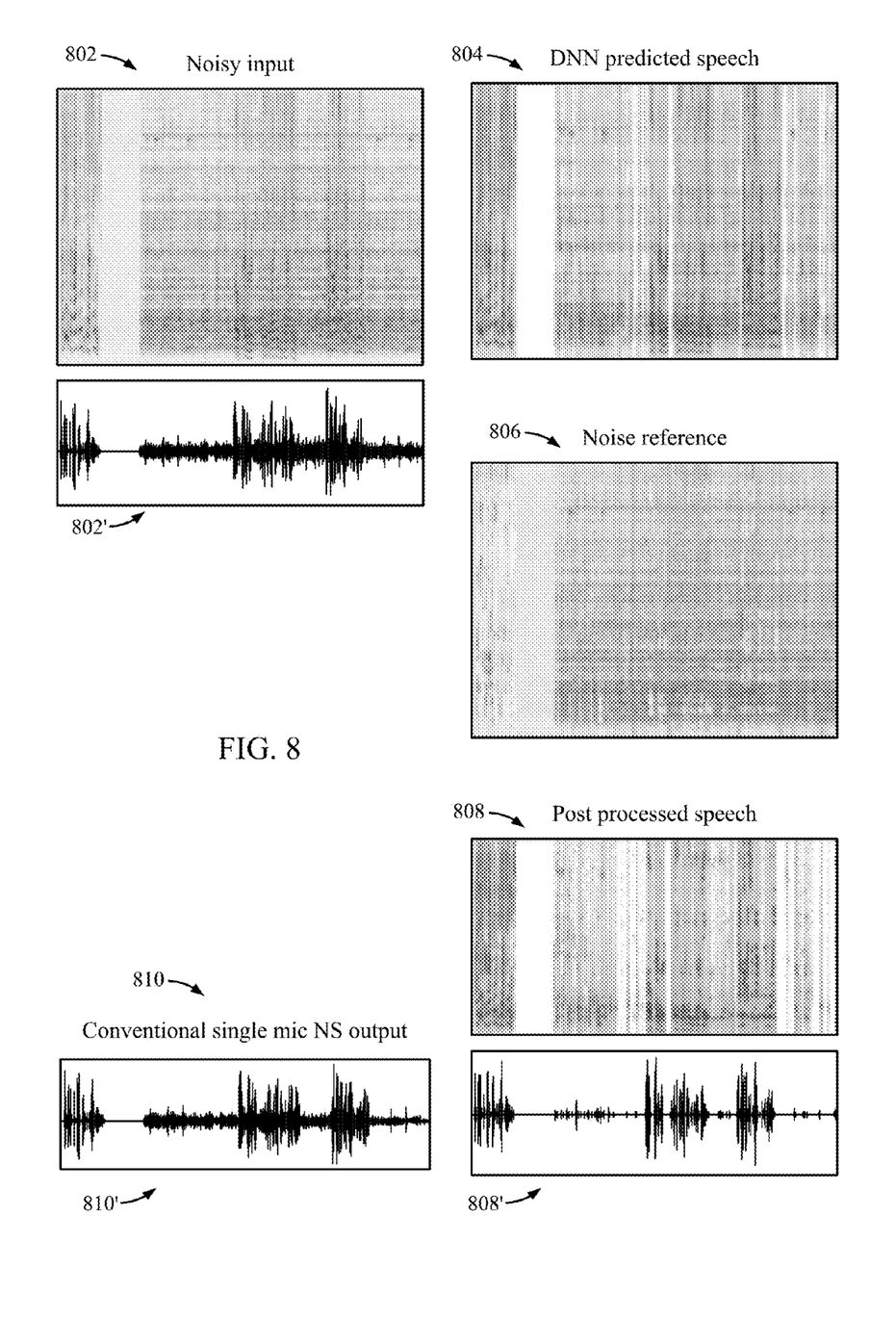
FIG. 8 provides exemplary spectrograms illustrating the result of DNN predicted filtering output resulting from the process of FIG. 7.

FIG. 8 provides exemplary spectrograms illustrating the result of DNN predicted filtering output resulting from the process of FIG. 7. In FIG. 8, the DNN predicted speech 804 derived from the noisy speech 802 (and corresponding speech waveform 802') is post-processed 808 based on the noise reference 806 resulting in a speech waveform 808' with substantially fewer noise artifacts than both the noisy input 802' and the resultant output of conventional single microphone noise suppression 810'.

For the various implementations herein disclosed, the methodology may be used to predict voiced and unvoiced speech activity and envelope, and multi-speaker training results in filters focusing on voice activity detecting and extracting the speech envelope. The methodology also works well for a large range of input signal-to-noise ratios. However, due to the targeted training data, the predicted output will only contain speech-like features. Nevertheless, even single speaker training can extract both envelope and speech harmonics. Furthermore, more sensor information, such as spectral features, direction of arrival (DoA), accelerometer information, etc., may be added to augment the feature space (i.e., feature vector=spectral feature+DoA+ sensor position). Additionally, feature vectors may be mapped to desired filter gain and labeled with specific audio event DNNs to provide enhanced audio event classification via use of specific/dedicated DNNs.

Other uses for the various implementations disclosed herein extend to voice recognition specific training and prediction of clean automatic speech recognition (ASR) features; gender specific or speaker specific DNN training to maximize speech envelope extraction; DNN based pitch prediction for post processing; DNN based blind bandwidth extension; separation of singing voice from background music; music/speech de-reverberation; and/or audio scene analysis (computational audition), among others.

Additionally, extracted audio events can be further refined using a dictionary approach (e.g., non-negative matrix factorization or "NMF") or vector quantization; that is, to refine the extracted audio harmonics, the DNN predicted speech output can be fitted to a pre-trained dictionary by NMF or vector quantization. The speech exemplar based dictionary may be trained offline, and activation coefficients for NMF can be obtained by minimizing the distance between input signal and estimated signal iteratively (iteration can be terminated when weights dominant activation coefficients are obtained). Sparseness constraints can be used to maintain fine harmonic structure (i.e., cleanup of spectrum valleys). For vector quantization, the nearest candidates can be found based on spectral distance measure between input spectrum and dictionary, and the weight of each basis function can be computed based on inverse of distance. Then more than one basis function can be selected for smooth reconstruction, and the reconstructed extracted audio event can be based on selected basis functions and associated weights.

Furthermore, although many rule based methods to obtain suppression gain (e.g., Wiener filtering) decide the suppression gain depending on SNR to meet certain criterion such as minimum mean squared error between clean and estimated speech, the processed output is not necessarily well aligned with voice recognition results since voice recognition accuracy is supposed to be dependent on the data (which have been used for training). Accordingly, voice recognition favored suppression gain is possible, keeping in mind that clean speech results are the best that can be expected, that clean speech is known, there is a close talking microphone captured signal with very low sensitivity (for measurement), and for offline simulation of original speech before mixing, the noise or convoluting room response can be used. Moreover, because voice recognition typically uses frequency magnitude response or smoothed and dimension reduced versions as feature vectors, it is desirable to have as similar magnitude response as possible and as similar feature vector as possible as in clean speech. In view of the foregoing, obtaining gain per frequency bin (or per smoothed and dimension reduced frequency band when sending the feature vector) is achievable by dividing the clean reference by the noisy input. Regardless, this label can then be used for training.

Noise reference generation by nulling speech is also possible. When utilizing a single microphone, a good noise reference (containing all the noise with minimum target speech leakage) will result in good noise suppression. In various other noise conditions, speech suppression gain can be used (instead of having noise suppression gain) as a label for training the network. Then, in the test phase, a speech removed noise reference will be available which can be used to obtain noise suppression gain. In contrast, for a multi-microphone implementation, both the magnitude and the phase matter, and the label becomes a complex number per microphone channel yet can nonetheless be calculated for simulation or can be obtained with measurement using some data dependent methods.

Personalization is also possible for users that are too different from the users used for training the DNNs. In such situations, the user might use a calibration phase during which the user talks to enable the system to adapt or the feature to be better matched.

DNN based speech processing may also feature pitch prediction and gender classification at pre-processing stages before filter gain prediction. In the training phase, a DNN classifier is first trained to be used as a robust pitch predictor (called "DNNp"). Separately, a gender classification DNN can be trained to classify speech as belonging to either male/female (called "DNNs"). The output of the DNNp and DNNs can be used as additional input nodes for the DNN gain predictor (called "DNNg"). Then, during the testing phase, the trained DNNp can be used to predict pitch, and the trained DNNs can be used to predict gender of speech, and the predicted pitch and predicted gender can be used in turn as additional input nodes during the testing phase of DNNg.

In addition to the foregoing, various aspects of implementations disclosed herein may also be utilized in the context of the Internet of Everything (IoE) such as, for example, home appliances capable of some form of intelligent communication. Such appliances may feature many different types of user-friend input interfaces, and a speech-based interface might be utilized in place of or in addition to one or more other types of interface. However, because many appliances are noisy or operate in noisy environments while they are operating, a speech-based interface for intelligent communication could benefit from DNN based speech processing variously disclosed herein. For certain implementations, this may be primarily targeted to cleaning up noisy speech in a shared acoustic space such as an automobile or other environment having multiple persons speaking or other sources of noise (e.g., road noise, engine noise, music, etc.).

One example—broadly extendible to a variety of other general use cases—might be the common household laundry machine in a laundry room that is augmented with its own microphone. For certain such implementations, a user in the laundry room may initiate a call on a mobile communications device, and the laundry machine might be made aware of the call taking place (e.g., may receive a notification regarding the call) which, for some implementations, may be done at the option of the user. In this sense, the microphone input or noise suppressed output at the wireless communication device may be utilized as a reference signal, and the noisy speech detected by the microphone from the laundry machine can serve as a noisy signal that is to be enhanced. From these two signals, an ideal gain can be calculated and labeled for training an associated DNN. Then, once adequately trained, the clean output produced for the laundry machine microphone can be a captured signal and processed accordingly as described earlier herein.

For this example, the noise types provided by the laundry machine are limited, so training/learning would not necessarily require much data. Moreover, other users might benefit from this training provided that there is enough data available for this two-microphone arrangement in accordance with the various implementations disclosed herein. Regardless, the overall benefit—given that laundry machine noise is very typical and the number of specific users for that device (at least in the home context) is limited—is cancelling typical noise when the laundry machine microphone detects user sound signals (e.g., a user talking to the machine) as described herein for receiving noisy speech as an input and producing clean speech as an output via use of DNN based speech processing.

Moreover, while this approach for training a statistical model (in a neural network) with training data does use both noisy and clean speech to train the model, the clean speech obtainable from a different device (in this example, the microphone of the wireless communication device) coupled with the noisy speech detected by the device can provide this kind of training data. Indeed, a wireless communication device can provide the clean speech simultaneously with the call, may be put in a special mode to collect voice data for the purpose of training the appliance, and so forth. In this fashion, multiple devices (providing multiple microphones corresponding to clean and noisy speech accordingly) can be utilized to train an appliance type device utilizing the various approaches described herein without limitation.

Figure 9:
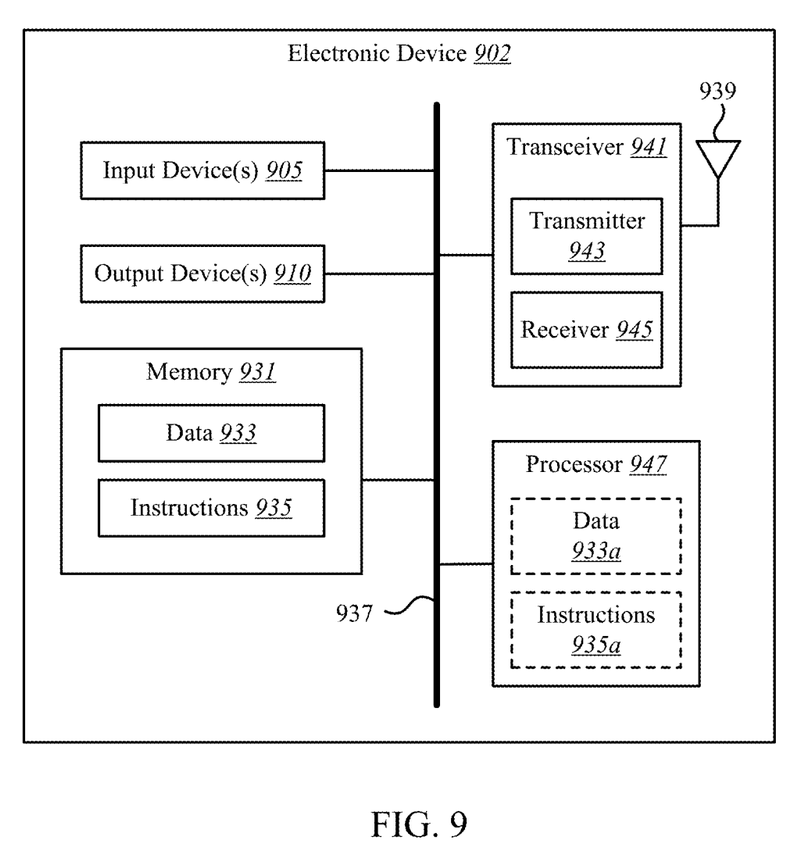
FIG. 9 illustrates certain components that may be included within an electronic device for implementing various implementations disclosed herein.

FIG. 9 illustrates certain components that may be included within an electronic device 902 for implementing various implementations disclosed herein (in full or in part). The electronic device 902 described in connection with FIG. 9 may be an example of and/or may be implemented in accordance with one or more of the electronic devices described herein.

The electronic device 902 includes a processor 947. The processor 947 may be a general purpose single- or multi-chip microprocessor (e.g., an ARM), a special purpose microprocessor (e.g., a digital signal processor (DSP)), a microcontroller, a programmable gate array, etc. The processor 947 may be referred to as a central processing unit (CPU). Although just a single processor 947 is shown in the electronic device 902 of FIG. 9, in an alternative configuration, a combination of processors (e.g., an ARM and DSP) could be used.

The electronic device 902 includes input device(s) 905, such as one or more microphones. Additional input devices may include a keyboard, a mouse, a pen, a voice input device, a touch input device, etc. The electronic device 902 includes output device(s) 910 such as a display, speakers, a printer, etc.

The electronic device 902 also includes memory 931 in electronic communication with the processor 947 (i.e., the processor 947 can read information from and/or write information to the memory 931). The memory 931 may be any electronic component capable of storing electronic information. The memory 931 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 933 and instructions 935 may be stored in the memory 931. The instructions 935 may include one or more programs, routines, sub-routines, functions, procedures, code, etc. The instructions 935 may include a single computer-readable statement or many computer-readable statements. The instructions 935 may be executable by the processor 947 to implement one or more of the methods described above. Executing the instructions 935 may involve the use of the data 933 that is stored in the memory 931. FIG. 9 shows some instructions 935a and data 933a being loaded into the processor 947.

The electronic device 902 may also include a transmitter 943 and a receiver 945 to allow transmission and reception of signals between the electronic device 902 and a remote location (e.g., a base station). The transmitter 943 and the receiver 945 may be collectively referred to as a transceiver 941. An antenna 939 may be electrically coupled to the transceiver 941. The electronic device 902 may also include (not shown) multiple transmitters, multiple receivers, multiple transceivers and/or multiple antenna.

The various components of the electronic device 902 may be coupled together by one or more buses, which may include a power bus, a control signal bus, a status signal bus, a data bus, etc. For simplicity, the various buses are illustrated in FIG. 9 as a bus system 937.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least." References to a "location" of a speaker indicates the location of the center of an acoustic-generating face of that speaker unless otherwise indicated by the context. The term "channel" is used at times to indicate a signal path and at other times to indicate a signal carried by such a path, according to the particular context.

Furthermore, unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one, whereas the term "subset" is used herein to indicate an integer quantity that is greater than or equal to one.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. Moreover, the phrase "based on" does not mean "based only on," unless expressly specified otherwise. In other words, the phrase "based on" describes both "based only on" and "based at least on."

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular figure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of the implementations of the methods described with respect to the various Figures, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed—at least in part—by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Stated differently, it is to be understood that the claims are not limited to the precise configuration and components illustrated above, and the various modifications, changes and variations may be made in the arrangement, operation and details of the systems, methods, and apparatus described herein without departing from the scope of the claims.

Furthermore, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims that follow.

What is claimed is:

1. A method for feature extraction and classification of audio signals using deep neural network based filter prediction, the method comprising:
    collecting audio event data under varying conditions;
    extracting features from the collected audio event data;
    labeling the extracted features with filter information;
    training a deep neural network to perform filter gain prediction using the extracted features; and
    performing filter gain prediction on a target audio event using the trained deep neural network comprising:
        applying a predicted filter to an input spectrogram to produce a first output;
        applying the predicted filter to the first output to produce a second output; and
        determining segmentation of the target audio event based at least in part upon the second output.

2. The method of claim 1, wherein performing filter gain prediction further comprises processing the target audio event using a noise reference.

3. The method of claim 1, wherein performing filter gain prediction further comprises:
    applying the predicted filter to the second output to produce a third output; and
    comparing the second output to the third output to determine if segmentation has improved and:
        if segmentation has improved, then iteratively processing the third output for a subsequent compare, and
        if segmentation has not improved, then outputting the third output.

4. The method of claim 1, wherein the training the deep neural network comprises:
    acquiring audio event data for feature extraction;
    computing labels for a plurality of output layers corresponding to the deep neural network; and
    training the deep neural network using the acquired audio event data and the computed labels.

5. The method of claim 4, wherein the training the deep neural network is iterative until the deep neural network predicts a filter gain meeting a predefined threshold.

6. The method of claim 1, wherein collecting audio event data is performed using a distributed array of microphones.

7. The method of claim 1, wherein the extracted features comprise normalized spectral band energies for training the deep neural network.

8. The method of claim 1, wherein the deep neural network is trained to perform filter gain prediction for target audio extraction by creating a targeted audio event stream using a predicted filter and creating a noise stream using a converse of the predicted filter.

9. A system for deep neural network based filter prediction for audio event classification and extraction, the system comprising:
    a memory; and
    a processor configured to:
        collect audio event data under varying conditions;
        extract features from the collected audio event data;
        label the extracted features with filter information;
        train a deep neural network to perform filter gain prediction using the extracted features; and
        perform filter gain prediction on a target audio event using the trained deep neural network comprising:
            applying a predicted filter to an input spectrogram to produce a first output;
            applying the predicted filter to the first output to produce a second output; and determining segmentation of the target audio event based at least in part upon the second output.

10. The system of claim 9, wherein the processor is further configured to process the target audio event using a noise reference.

11. The system of claim 9, wherein the processor configured to perform the filter gain prediction is further configured to:
apply the predicted filter to the second output to produce a third output; and
compare the second output to the third output to determine if segmentation has improved and:
if segmentation has improved, then iteratively process the third output for a subsequent compare, and
if segmentation has not improved, then output the third output.

12. The system of claim 9, wherein the processor configured to train the deep neural network comprises the processor configured to:
acquire audio event data for feature extraction;
compute labels for a plurality of output layers corresponding to the deep neural network; and
train the deep neural network using the acquired audio event data and the computed labels.

13. The system of claim 12, wherein the processor configured to train comprises the processor configured to perform iteratively until the deep neural network predicts a filter gain meeting a predefined threshold.

14. The system of claim 9, wherein the processor configured to collect audio event data comprises the processor configured to use a distributed array of microphones operatively coupled to the processor.

15. The system of claim 9, wherein the extracted features comprise normalized spectral band energies for training the deep neural network.

16. An apparatus for feature extraction and classification of audio signals using deep neural network based filter prediction, the apparatus comprising:
means for collecting audio event data under varying conditions;
means for extracting features from the collected audio event data;
means for labeling the extracted features with filter information;
means for training a deep neural network to perform filter gain prediction using the extracted features; and
means for performing filter gain prediction on a target audio event using the trained deep neural network comprising:
means for applying a predicted filter to an input spectrogram to produce a first output;
means for applying the predicted filter to the first output to produce a second output; and
means for determining segmentation of the target audio event based at least in part upon the second output.

17. The apparatus of claim 16, further comprising means for processing the target audio event using a noise reference.

18. The apparatus of claim 16, wherein the means for performing filter gain prediction further comprises:
means for applying the predicted filter to the second output to yield a third output; and
means for comparing the second output to the third output to determine if segmentation has improved and:
means for iteratively processing the third output for a subsequent compare if segmentation has improved, and
means for outputting the third output if segmentation has not improved.

19. The apparatus of claim 16, wherein the means for training the deep neural network comprises:
means for acquiring audio event data for feature extraction;
means for computing labels for a plurality of output layers corresponding to the deep neural network; and
means for training the deep neural network using the acquired audio event data and the computed labels.

20. The apparatus of claim 19, wherein the means for training is configured to perform iteratively until the deep neural network predicts a filter gain meeting a predefined threshold.

21. The apparatus of claim 16, wherein the means for collecting audio event data comprises a distributed array of microphones.

22. The apparatus of claim 16, wherein the extracted features comprise normalized spectral band energies for training the deep neural network.

23. A non-transitory computer readable medium comprising computer-executable instructions for feature extraction and classification of audio signals using deep neural network based filter prediction, the computer-executable instructions comprising instructions for:
collecting audio event data under varying conditions;
extracting features from the collected audio event data;
labeling the extracted features with filter information;
training a deep neural network to perform filter gain prediction using the extracted features; and
performing filter gain prediction on a target audio event using the trained deep neural network comprising:
applying a predicted filter to an input spectrogram to produce a first output;
applying the predicted filter to the first output to produce a second output; and
determining segmentation of the target audio event based at least in part upon the second output.

24. The computer readable medium of claim 23, wherein the instructions for performing filter gain prediction further comprise instructions for processing the target audio event using a noise reference.

25. The computer readable medium of claim 24, wherein the instructions for filter gain prediction further comprises instructions for:
applying the predicted filter to the second output to yield a third output; and
comparing the second output to the third output to determine if segmentation has improved and:
if segmentation has improved, iteratively processing the third output for a subsequent compare, and
if segmentation has not improved, then outputting the third output.

26. The computer readable medium of claim 23, wherein the instructions for training the deep neural network further comprises instructions for:
acquiring audio event data for feature extraction;
computing labels for a plurality of output layers corresponding to the deep neural network; and
training the deep neural network using the acquired audio event data and the computed labels.

27. The computer readable medium of claim 26, wherein training is iterative until the deep neural network predicts a filter gain meeting a predefined threshold.

28. The computer readable medium of claim 23, further comprising instructions for collecting audio event data using a distributed array of microphones.

29. The computer readable medium of claim 23, further comprising instructions for the extracted.

\* \* \* \* \*